(12) United States Patent
Schade et al.

(10) Patent No.: US 11,056,024 B2
(45) Date of Patent: Jul. 6, 2021

(54) SEAL AND SEALING METHOD

(71) Applicants: Fraunhofer-Gesellschaft Zur Förderung Der Angewandten Forschung E.V., Munich (DE); OHB System AG, Bremen (DE)

(72) Inventors: Wolfgang Schade, Goslar (DE); Günter Flachenecker, Hannover (DE); Markus Thiel, Goslar (DE); Rainer Rathje, Lilienthal (DE); Christian Gorecki, Bremen (DE); Andreas Thoma, Bremen (DE)

(73) Assignees: Fraunhofer-Gesellschaft Zur Forderung Der Angewandten Forschung E.V., Munich (DE); OHB System AG, Bremen (DE)

( * ) Notice: Subject to any disclaimer, the term of this patent is extended or adjusted under 35 U.S.C. 154(b) by 179 days.

(21) Appl. No.: 16/080,044

(22) PCT Filed: Feb. 20, 2017

(86) PCT No.: PCT/EP2017/053771
§ 371 (c)(1),
(2) Date: Aug. 27, 2018

(87) PCT Pub. No.: WO2017/144405
PCT Pub. Date: Aug. 31, 2017

(65) Prior Publication Data
US 2019/0066543 A1  Feb. 28, 2019

(30) Foreign Application Priority Data

Feb. 25, 2016  (DE) ..................... 10 2016 203 007.8

(51) Int. Cl.
*G09F 3/00* (2006.01)
*G09F 3/03* (2006.01)
(Continued)

(52) U.S. Cl.
CPC ....... *G09F 3/0376* (2013.01); *G01D 5/35316* (2013.01); *G01M 11/086* (2013.01);
(Continued)

(58) Field of Classification Search
CPC ......... G09F 3/03; G09F 3/0376; G01D 5/353; G01D 5/35316; G02B 6/02;
(Continued)

(56) References Cited

U.S. PATENT DOCUMENTS 4,725,110 A * 2/1988 Glenn ...................... G02B 5/18
356/32
4,950,883 A * 8/1990 Glenn ................ G01D 5/35383
250/227.14
(Continued)

FOREIGN PATENT DOCUMENTS

CN  201345193 Y  11/2009
WO  2015036045 A1  3/2015

OTHER PUBLICATIONS

International Search Report dated Apr. 18, 2017 (PCT/EP2017/053771).
(Continued)

*Primary Examiner* — Suzanne L Barrett
(74) *Attorney, Agent, or Firm* — Alix, Yale & Ristas, LLP

(57) ABSTRACT

The invention relates to a seal containing a substrate which can be applied to an object to be sealed, so that said seal is changed when it is removed without authorization, wherein the substrate contains or comprises a polymer and/or a glass and at least one optical waveguide is arranged in the substrate, at least one first Bragg grating being arranged in said optical waveguide, wherein the substrate has a thickness of less than 200 μm. The invention further relates to a
(Continued)

system having a seal of this kind and having an evaluation device, and also to a sealing method.

20 Claims, 3 Drawing Sheets

(51) Int. Cl.
    *G01D 5/353*     (2006.01)
    *G06F 21/64*     (2013.01)
    *G08B 13/12*     (2006.01)
    *G01M 11/08*     (2006.01)
    *G06F 21/00*     (2013.01)
    *G02B 6/124*     (2006.01)
    *G02B 6/02*     (2006.01)

(52) U.S. Cl.
    CPC ......... *G02B 6/02076* (2013.01); *G02B 6/124* (2013.01); *G06F 21/00* (2013.01); *G06F 21/64* (2013.01); *G08B 13/128* (2013.01)

(58) Field of Classification Search
    CPC ... G02B 6/02076; G02B 6/124; G01M 11/08; G01M 11/086; G06F 21/00; G06F 21/64; G08B 13/186; G08B 13/128
    USPC .......................................................... 70/57.1
    See application file for complete search history.

(56) References Cited

U.S. PATENT DOCUMENTS

| | | | | |
|---|---|---|---|---|
| 5,218,651 A | * | 6/1993 | Faco | G02B 6/02133 385/37 |
| 5,295,208 A | * | 3/1994 | Caulfield | G02B 6/34 385/27 |
| 5,351,324 A | | 9/1994 | Forman | |
| 5,471,551 A | | 11/1995 | Kragl et al. | |
| 5,633,975 A | * | 5/1997 | Gary | G02B 6/02057 385/147 |
| 5,852,687 A | * | 12/1998 | Wickham | G02B 6/2861 385/14 |
| 6,185,358 B1 | * | 2/2001 | Park | G02B 6/02085 385/140 |
| 6,215,927 B1 | * | 4/2001 | Singh | G01L 1/246 385/37 |
| 6,330,257 B1 | * | 12/2001 | Major, Jr. | H01S 5/146 372/102 |
| 6,580,511 B1 | * | 6/2003 | Discenzo | G01D 5/35306 356/477 |
| 7,488,929 B2 | * | 2/2009 | Townley-Smith | G08B 13/124 250/227.14 |
| 7,551,268 B2 | * | 6/2009 | Discenzo | H02K 11/35 356/32 |
| 8,135,250 B1 | * | 3/2012 | Wach | G02B 6/3652 385/37 |
| 9,335,482 B2 | * | 5/2016 | Hao | G08B 13/124 |
| 10,578,490 B2 | * | 3/2020 | Claes | G01J 3/0256 |
| 2006/0214789 A1 | | 9/2006 | Posamentier et al. | |
| 2017/0044053 A1 | | 2/2017 | Schuh et al. | |

OTHER PUBLICATIONS

Thiel, Markus et al., "Femtosecond laser writing of Bragg grating waveguide bundles in bulk glass," Optics Letters vol. 40, No. 7, p. 1266-69, Apr. 1, 2015.

* cited by examiner

SEAL AND SEALING METHOD

FIELD OF THE DISCLOSURE

The invention relates to a seal, containing a substrate which can be applied to an object to be sealed, so that the seal is changed when it is removed without authorization. The invention also relates to a method for sealing, in which a seal which contains a substrate is applied to an object to be sealed, so that the seal is changed when it is removed without authorization. Seals and methods of the above mentioned kinds can be used to prove unauthorized manipulations of all kinds of objects.

BACKGROUND

It is known from practice to produce seals e.g. with a substrate of printed and perforated paper, the underside of which is provided with an adhesive layer. Having applied the seal to an object to be sealed, this seal can no longer be removed without damage. Every attempt to manipulate the seal changes the optical appearance since either the seal is completely missing or, in an attempt to remove and reapply the seal, the cracks in the substrate which are produced when the seal is removed can be proved. The replacement of the seal is usually impossible for a person who removed the seal without authorization since seals with an appropriate print image are not available to this person.

Nevertheless, it has been shown that such known paper seals are not always usefully applicable. For example, there is a need to seal extremely small objects, such as microchips. It is thus possible to avoid or discover manipulations by the end user or dealer. There is also a need to provide seals with greater security, the manipulation of which is even more difficult. In addition, there is a need to read out a seal in automated fashion in order to rapidly and reliably check the integrity of even large product batches.

SUMMARY

Therefore, the object of the present invention is to provide a seal with greater security, an automated read-out possibility and, in some embodiments, also smaller dimensions. There is also a need to reliably check a seal even if it is applied at an inaccessible location and has to be read out from some distance, e.g. without direct view.

This object is achieved according to the invention by a device according to claim 1, a system according to claim 9 and a method according to claim 10. Advantageous developments of the invention are found in the subclaims.

The invention proposes a seal which contains a substrate that can be applied to an object to be sealed. The substrate can have e.g. a polygonal or round basic shape and be applied mechanically to the object to be sealed by clamping or by welding or adhering. If the object to be sealed is a casting component made of metal or plastic material, e.g. an injection molded component or a thermosetting component, the seal can also be embedded directly into the object to be sealed, e.g. by inserting the seal into the mold before the primary forming of the object to be sealed.

According to the invention, the substrate contains a polymer and/or a glass. In some embodiments of the invention, the substrate can therefore exclusively contain a polymer, e.g. polycarbonate, polyethylene or polyethylene terephthalate. In other embodiments of the invention, the substrate can exclusively contain a glass, e.g. a borosilicate glass, an alkali silicate glass or an aluminum borosilicate glass. In yet other embodiments of the invention, the substrate can contain both a glass and also a polymer. Here, at least one layer of a polymer and at least one layer of a glass can be joined together over their entire surface, e.g. by adhesion.

In some embodiments of the invention, the substrate has a thickness of less than about 200 µm. In other embodiments of the invention, the substrate has a thickness of less than about 100 µm. In yet other embodiments of the invention, the thickness of the substrate is less than about 80 µm. Finally, the thickness of the substrate can be less than about 50 µm in some embodiments. The substrate has at least a thickness of more than about 10 µm, more than about 20 µm or more than about 30 µm. Such a thin and, in the case of glass, also brittle substrate, ensures that it is at least deformed and often also damaged in a manipulation attempt, e.g. in the case of a removal without authorization. In addition, a mechanical stress can easily be introduced into such a substrate and it usually does not impair the function of the object to be sealed.

In every spatial direction, the substrate can have a lateral dimension between about 1 mm and about 40 mm or between about 2 mm and about 20 mm or between about 3 mm and about 10 mm. Here, the dimensions of the substrate are usually not restricted but are only limited by the size of the object to be sealed and/or protected and the ease of handling of the thin and possibly fragile substrate.

Furthermore, the substrate contains at least one optical waveguide. The waveguide consists of a spatial region which has a modified refractive index with respect to the surrounding material, as a result of which total reflection occurs at the boundary. Therefore, light which enters the waveguide can be guided within the waveguide in the plane of the substrate.

At least one first Bragg grating is disposed inside the optical waveguide. The Bragg grating contains in turn a plurality of spatial regions with modified refractive index, which are arranged in the waveguide. The spacing between the individual spatial regions defines the grating constant of the Bragg grating. It can be constant or change along the longitudinal extension of the Bragg grating. Such a Bragg grating has the effect that a partial spectrum of the light propagating inside the waveguide is reflected and other wavelengths can pass the grating in undisturbed fashion in the transmission direction.

The grating constant originally defined in the production of the Bragg grating can be changed by mechanical stress and/or thermal expansion. When the substrate breaks, both a Bragg grating and the at least one waveguide in the substrate can be damaged. Therefore, a change in the seal according to the invention can be proved by a change in the transmitted or reflected spectrum, which is referred to below as a signature of the seal.

In some embodiments of the invention, the seal can contain a plurality of Bragg gratings having different grating constants. In some embodiments of the invention, the number of Bragg gratings of a seal can be between 1 and about 25. In other embodiments of the invention, the number of Bragg gratings in a seal can be between about 4 and about 20. In yet other embodiments of the invention, the number of Bragg gratings in a seal can be between about 4 and about 10. Here, all Bragg gratings of a seal can have different grating constants. In other embodiments of the invention, some Bragg gratings can have an identical or similar grating constant. In this case, different Bragg gratings can be distinguished by the signal propagation time if pulsed radiation is coupled into the at least one optical path of travel of the seal to query the signature.

The invention now proposes to couple an optical interrogation signal into the at least one optical waveguide after the application of the seal and to detect the reflected and/or transmitted light. This signal generated by the seal as a result of the optical interrogation pulse is referred to below as the signature of the seal and is dependent on the kind and the number of Bragg gratings, the kind and number of the optical waveguides in the seal, the temperature, the mechanical stress of the seal and the kind of optical interrogation pulse. The signal read out for the first time after the application of the seal to an object to be protected can be stored as a reference signal. If, at a later point in time, the integrity of the seal shall be checked, the integrity of the seal can be checked by another interrogation with an identical or similar interrogation signal. If the signal produced by the seal at a later point in time differs from the reference signal, the manipulation of the seal is proven.

In some embodiments of the invention, at least one coupler can additionally be arranged in the substrate. As a result, a plurality of optical waveguides in the seal can be connected to a terminal of the connection waveguide. This increases the reliability and the manipulation security of the seal without enlarging the effort for the interrogation of the seal.

In some embodiments of the invention, the at least one waveguide can be configured to allow a single-mode light conduction. Depending on the wavelength used for the interrogation this may mean that the waveguide has a diameter of about 5 μm to about 15 μm or of about 8 μm to about 12 μm. This can further increase the counterfeit protection of the seal.

In some embodiments of the invention, at least one first Bragg grating can show a polarization-dependent reflection or transmission. This can be achieved in that the individual spatial regions of the Bragg grating with modified refractive index are not circular or spherical but elongate or in the form of an ellipsoid, the short semi-axis of which is smaller than the diameter of the waveguide. In this case, the Bragg grating shows a different reflection or transmission behavior in the case of a different polarization direction of the optical interrogation signal. As a result, the signature of the seal can thus become more complex, which leads to a higher counterfeit protection and an improved imitation protection.

In some embodiments of the invention, the seal can also contain a connection waveguide, by means of which the seal can be connected to a reading device. The connection waveguide can contain or consist of an optical polymer or glass fiber known per se. The end of the connection waveguide can be connected to an optical plug-in connector known per se. In this way, the seal can easily be connected to a reading device and after the read-out be separated again without mechanical stress or even damage of the seal resulting. Furthermore, when the connection waveguide has an appropriate length, the seal can be read out even if it is installed in a concealed fashion, without there being a direct visual contact to the user.

In some embodiments of the invention, a plurality of sealed objects can be sealed again. For example, a plurality of integrated circuits can be protected individually by a respective seal and a plurality of such circuits can be connected in an assembly group, e.g. a printed circuit board. The latter can be protected by another seal. In this case, an inner seal can be checked via the connection waveguides guided to the outside even if it is inside the outer sealing sphere. For this purpose, it is not necessary to break the outer sealing sphere.

In some embodiments of the invention, the substrate can be surrounded by a frame at least on one side edge. On the one hand, such a frame can be used to connect an optical fiber to the at least one waveguide in the substrate to thus connect the seal to a reading device. The frame here allows the guiding of the optical fiber in a way protected against mechanical damage. Furthermore, the frame can serve to avoid or at least reduce the penetration of stray light via the side edges, as a result of which the signature of the seal can be read out with greater accuracy. The subsequent adhesion of the optical seal by means of the frame can protect the connection waveguide against mechanical manipulations or removal.

In some embodiments of the invention, the frame can be designed as a double frame with an inner frame bearing against the substrate and an outer frame surrounding the inner frame. The double frame can serve to protect the seal against a lateral attack. In this case, the inner frame can be attached to the substrate or to the boundary edges thereof. The connection waveguide is then wound around the inner frame, which is done with at last one entwinement of the inner frame and in some embodiments of the invention also with a plurality of entwinements, e.g. between 2 and about 10. Thereafter, the outer frame is attached and fastened, e.g. by adhesion or joined by welding or a sealing compound. The outer frame can have inlet and outlet openings to introduce and lead away the connection waveguide. If the frame is drilled into in a manipulation attempt, this will cause a severing of the connection waveguide. As a result, it is impossible to read out the signature so that the manipulation can easily be detected.

In some embodiments of the invention, the connection waveguide can contain at least a second Bragg grating. The second Bragg grating can serve to determine the temperature at the time when the seal is read out. As a result, the signature of the seal that changes with the temperature can be standardized, as a result of which it can be determined whether the seal was modified without authorization even if the temperatures fluctuate.

If the seal is equipped with a double frame, the second Bragg grating, which is provided for temperature measurement can be arranged between the inner frame and the outer frame in a longitudinal portion of the connection waveguide, which is laid without curvature and optionally mechanically decoupled from the substrate, such that the second Bragg grating is protected against mechanical changes of the grating constant. The accuracy of the temperature measurement can thus be increased.

Furthermore, the invention relates to a system with an above described optical seal and a reading device. The reading device is configured to produce an optical interrogation signal and to detect the light reflected or transmitted by the seal. Furthermore, the reading device can contain a spectrometer for the analysis of the reflected or transmitted light. In addition, the reading device can optionally determine the propagation time of the optical signal. Finally, the reading device can contain an evaluation unit and an optional reference signal memory. The evaluation system can be or contain e.g. a microprocessor or a digital signal processor. As a result, the signature of the seal at the time of interrogation can be compared with the original signature stored in the reference signal memory to thus prove a change in the seal or the integrity thereof.

In some embodiments of the invention, the seal can be exposed to mechanical stress when it is applied to the object to be sealed and can be fixed in this condition. Thus, even if the seal was removed without authorization and was replaced with a nominally equivalent seal having equal waveguides and identical Bragg gratings, the manipulation can be proven since it is usually impossible to apply the replaced seal with equal mechanical stress and/or identical deformation to the object to be sealed.

In some embodiments of the invention, the first and second optical interrogation signal used for detecting the signature of the seal can be identical. Therefore, the descriptions "first" and "second" optical interrogation signals are used for equivalent signals which were coupled into the optical seal at different points in time.

In some embodiments of the invention, the first and/or second optical interrogation signal can contain a plurality of individual pulses, at least some of which have different wavelengths and/or different propagation times and/or different polarization. It is thus possible to generate an interrogation signal adapted to the respective seal or to a group of seals, said signal taking into account whether polarization-dependent Bragg gratings are available or whether different Bragg gratings of equal grating constants shall be discriminated on the basis of the propagation time. Finally, the interrogation signal can also take into account whether Bragg gratings having a different grating constant are available in the seal, which require a large spectral width of the interrogation signal for the read-out, or whether interrogation pulses with short time structure are necessary.

Thus, in some embodiments of the invention, the light source of the reading device can be at least one superluminescent diode or a semiconductor laser or a gas discharge lamp or contain such a light source.

BRIEF DESCRIPTION OF THE DRAWINGS

The invention shall be explained in more detail below by means of drawings without limiting the general inventive concept, wherein.

DETAILED DESCRIPTION

Figure 1:
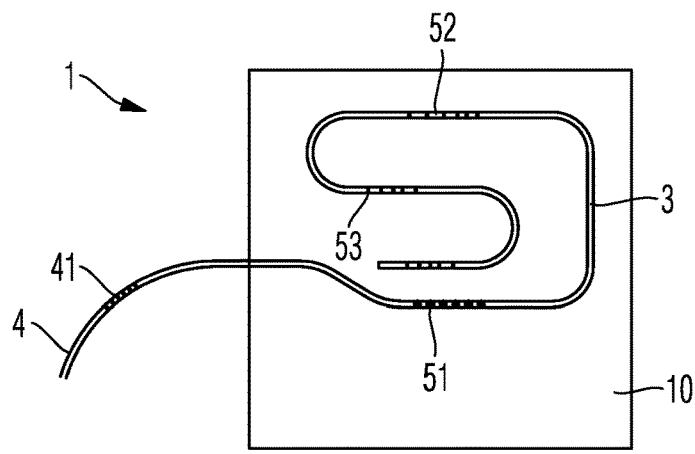
FIG. 1 shows a first embodiment of a seal according to the invention.

FIG. 1 shows a first embodiment of a seal 1 according to the invention. The seal 1 contains a substrate 10, which is made e.g. from a polymer or thin glass or a composite material from at least one polymer and at least one thin glass. The substrate 10 has a thickness of less than about 200 µm. In other embodiments of the invention, the substrate can have a lower thickness, e.g. less than about 100 µm, less than about 80 µm or less than about 50 µm.

In the illustrated embodiment, the substrate 10 is approximately square. However, in some embodiments of the invention, the substrate can also have another polygonal or round form. The areal extent of the substrate 10 can be selected between about 1 $mm^2$ and about 40 $mm^2$, wherein larger or smaller dimensions can also be chosen.

At least one waveguide 3 is disposed in the substrate 10. The waveguide 3 consists of a core and a cladding, each having different refractive indices, such that light can be guided by total reflection on the boundary between core and cladding.

According to the invention, the material of the substrate 10 is used as a cladding, such that the waveguide 3 can be produced by writing the core into the substrate. The waveguide 3 can be laid in straight or meandering fashion in the substrate. The illustrated geometry should therefore only be regarded as an example. The invention does not teach the use of a special course of the waveguide 3 as a solution principle.

In the illustrated embodiment four first Bragg gratings 51, 52, 53 and 54 are arranged in the waveguide 3. Each Bragg grating contains a plurality of spatial regions, the refractive indices of which differ from the refractive index of the core. These spatial regions are arranged relative to one another at a predeterminable spacing which defines the grating constant of the Bragg grating. A single Bragg grating 51, 52, 53 or 54 can have a length within the waveguide 3 of between 1 mm and about 30 mm or between about 2 mm and about 10 mm.

Like the first Bragg gratings 51, 52, 53 and 54, the waveguide 3 in the interior of the substrate 10 can also be produced by point-to-point exposure with a short-pulse laser. This makes it possible to produce each seal with an individual signature. In other embodiments of the invention, a mask can be used for the exposure to change the refractive index in the exposed spatial regions to such an extent that the desired structures are generated in the substrate 10. It is thus possible to produce identical seals with little effort. Nevertheless, seals which were reproduced with identical production parameters also show sufficient differences as regards the signatures so that they can still be distinguished and the replacement of a broken seal with an identical seal is impossible. As a result, the security can be increased.

The waveguide 3 is brought into contact with a connection waveguide 4 on the outer edge of the substrate 10. The connection waveguide 4 can be or contain e.g. a polymer or glass fiber. In some embodiments of the invention, the two ends of the waveguide 3 can be connected to a connection waveguide 4. In this case, the signature of the seal can be determined as regards reflection and transmission to thus improve accuracy. In other embodiments of the invention, only a single connection waveguide 4 is attached to the seal 1, as illustrated in FIG. 1.

The connection waveguide 4 has an optional second Bragg grating 41. The Bragg grating 41 serves to determine the temperature in the vicinity of the seal 1, such that the signature produced by the seal 1 can be corrected for temperature fluctuations.

Figure 2:
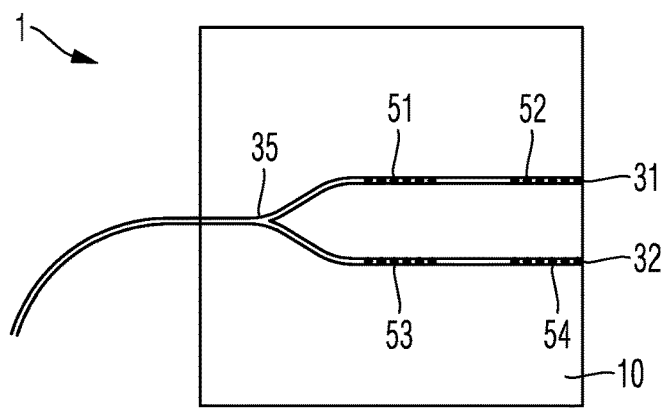
FIG. 2 shows a second embodiment of the seal according to the invention.

FIG. 2 shows a second embodiment of the present invention. The same constituents of the invention are provided with the same reference signs. Therefore, the below description is limited to the essential differences.

According to FIG. 2, a coupler 35 is also arranged on the substrate 10 and is configured to divide light coupled in via the connection waveguide 4 into two waveguides 31 and 32. Each of the waveguides 31 and 32 contains a first Bragg grating 51 and 52 or 53 and 54. The light reflected by these Bragg gratings is reunited in the coupler 35 and can be supplied to the connection waveguide 4.

In the same way as shown in FIG. 2 by means of a single coupler 35, waveguides can be split multiple times in tree-like fashion, such that the entire area of the substrate 10 is honeycombed with a network of waveguides with respectively associated Bragg gratings.

The meandering course of the waveguide 3 that is outlined in FIG. 1 can also be combined with one or more couplers to cover a larger area of the substrate 10.

Figure 3:
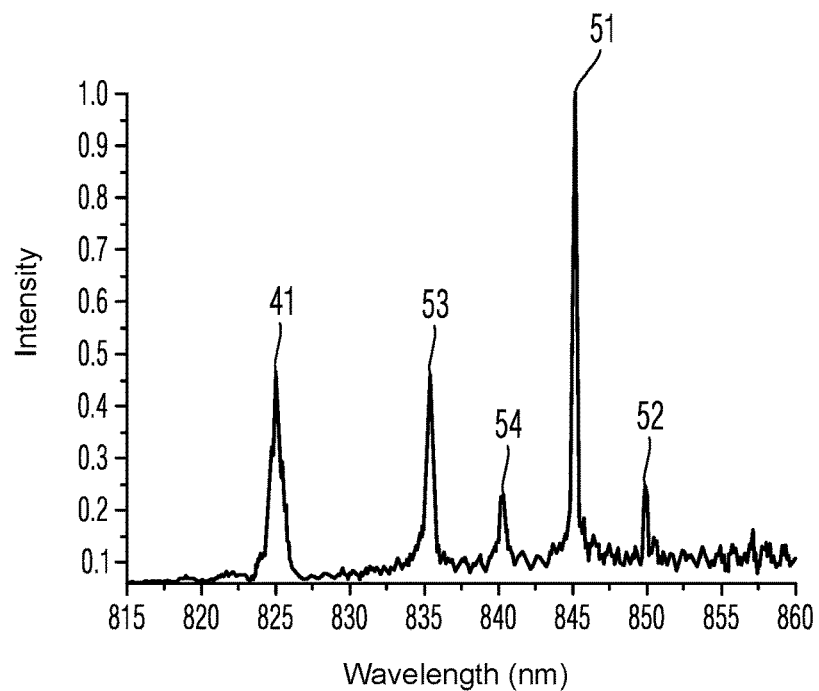
FIG. 3 shows, by way of example, a signature of a seal.

FIG. 3 shows the spectral reply or the signature of an optical seal, as explained by way of example on the basis of FIGS. 1 and 2. What is shown is the intensity on the ordinate against the wavelength on the abscissa. FIG. 3 shows the intensity of reflected light depending on the wavelength in the case of an illumination with spectral broadband radiation, e.g. from a superluminescent diode.

As is clear from FIG. 3, the reflection spectrum has 5 maximums. The first maximum at about 825 nm can be associated with the second Bragg grating 41 in the connection waveguide 4. This signal serves in a manner known per se to detect the temperature such that the signature of the first Bragg gratings 51, 52, 53 and 54 can be standardized to a standard temperature.

The four reflection maximums 51, 52, 53 and 54 are also shown and can be associated with the four Bragg gratings 51, 52, 53 and 54 available in the seal with respectively different grating constant. They vary with respect to the spectral width, the position of the reflection maximum or the background when different seals are read out or a seal already applied to an object was either damaged or was applied to the object to be sealed with different mechanical stress. Therefore, a manipulation of the seal 1 can be proven when the signature explained by means of FIG. 3 as an example was detected and stored after the assembly of the seal and differs from a signature recorded at a later date. This correlation is explained e.g. by way of FIG. 4.

Figure 4:
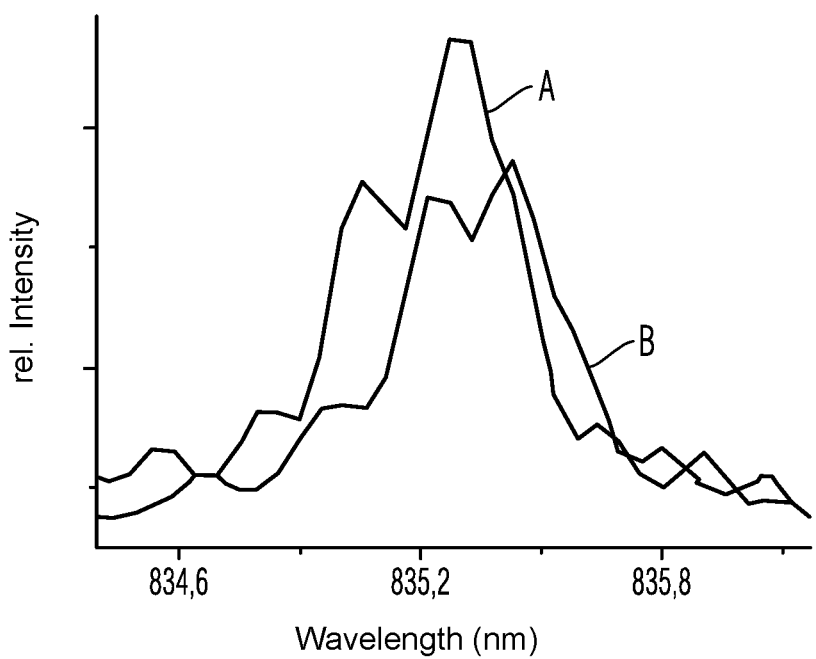
FIG. 4 shows the change in the signature on the basis of the mechanical stress of the substrate.

FIG. 4 shows an enlarged illustration from FIG. 3 with the intensity maximum of the Bragg grating 53. Curve A illustrates the spectral reply of a Bragg grating in the case of a first mechanical stress of the substrate 10 and curve B shows the spectral reply of the Bragg grating 53 in the case of a second mechanical stress of the substrate 10. Since, as a rule, different mechanical stresses are induced in the substrate 10 by the assembly alone, even nominally identical seals can be distinguished from one another after the assembly on an object to be sealed on the basis of their signature. This applies all the more so when an already attached seal is damaged or replaced with a new seal without authorization. In this case, too, the manipulation attempts can be clearly proven on the basis of the different signature. Even the partial removal changes the mechanical stress in the substrate, thus changing the signature in the seal.

FIGS. 3 and 4 show a comparatively simple signature which merely utilizes the spectrometrically determined intensity on the basis of the wavelength. Other embodiments of the invention can additionally consider the polarization or the signal propagation time to determine a more complex signature of the optical seal and thus prove manipulation attempts in an even more reliable way.

Figure 5:
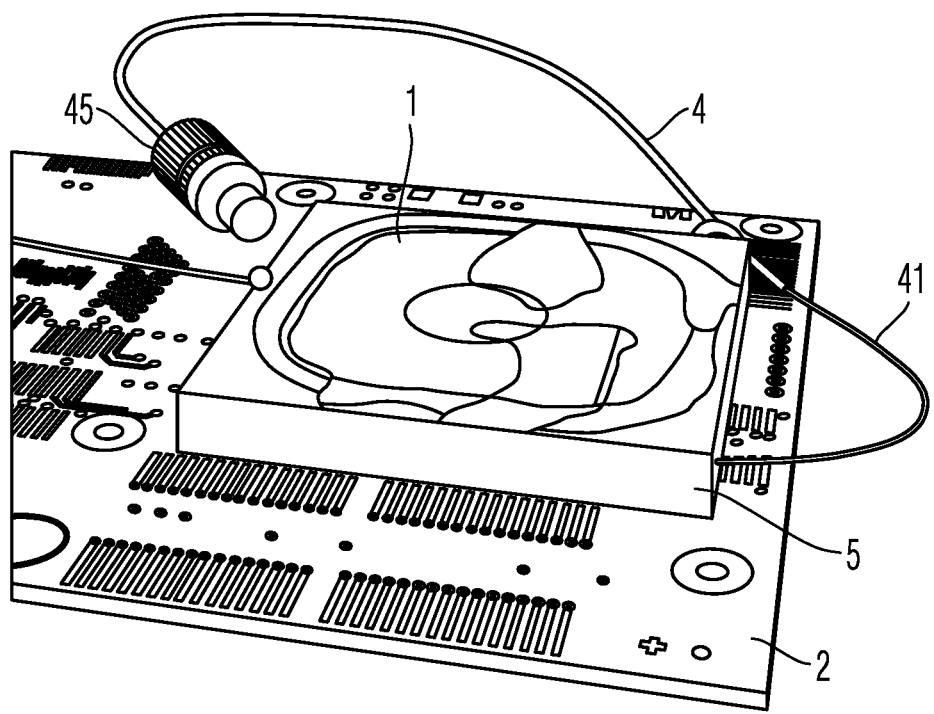
FIG. 5 shows an example of use of the seal according to the invention.

FIG. 5 shows, by way of example, the assembly of an optical seal 1 on an object 2 to be protected. The object 2 comprises a microchip which is attached to a printed circuit board known per se. the microchip on the printed circuit board is surrounded by a frame 5, which is attached to the printed circuit board e.g. by adhesion.

The frame 5 accommodates the seal 1, which is also connected to the frame by means of adhesion. This may be accompanied by mechanical stresses can thus be used to deform the seal 1 or the substrate 10 thereof in a defined way and to apply a unique mechanical stress to each seal 1 that influences the signature as explained above by means of FIGS. 3 and 4.

As already explained above, the seal 1 is connected to a connection waveguide 4 which accommodates a second Bragg grating 41 to detect the temperature. The connection waveguide 4 is provided with a plug-in connector 45 to thus be connected to a reading device which is explained by means of FIG. 7.

Since the frame 5 and the seal 1 enclose the underlying microchip and all its contacts, the microchip cannot be compromised, e.g. by unsoldering or by another manipulation.

For this purpose, it is necessary to damage the seal 1 by violence. Such a manipulation can clearly be proven by means of the signature since other seals have either a different waveguide course, different grating constants of the Bragg gratings or other differences with respect to the original seal. Even if a nominally identical seal was attached to the frame 5, it would automatically be subjected to a different mechanical stress during the assembly on account of its low thickness, said stress also changing the signature as explained by means of FIG. 4.

FIG. 6 shows again, by way of example, the change in the signature when the seal is damaged by a laser beam. This Figure shows the reflection maximums of two Bragg gratings in a seal which, as explained by means of FIG. 2, has two waveguides 31 and 32. In order to detect the signature, comparatively broad-band radiation, e.g. from a superluminescent diode, was introduced into the waveguide, and the light reflected by the Bragg gratings was detected.

In order to carry out an exemplary manipulation of the seal, the substrate 10 was perforated by means of a laser.

Figure 6:
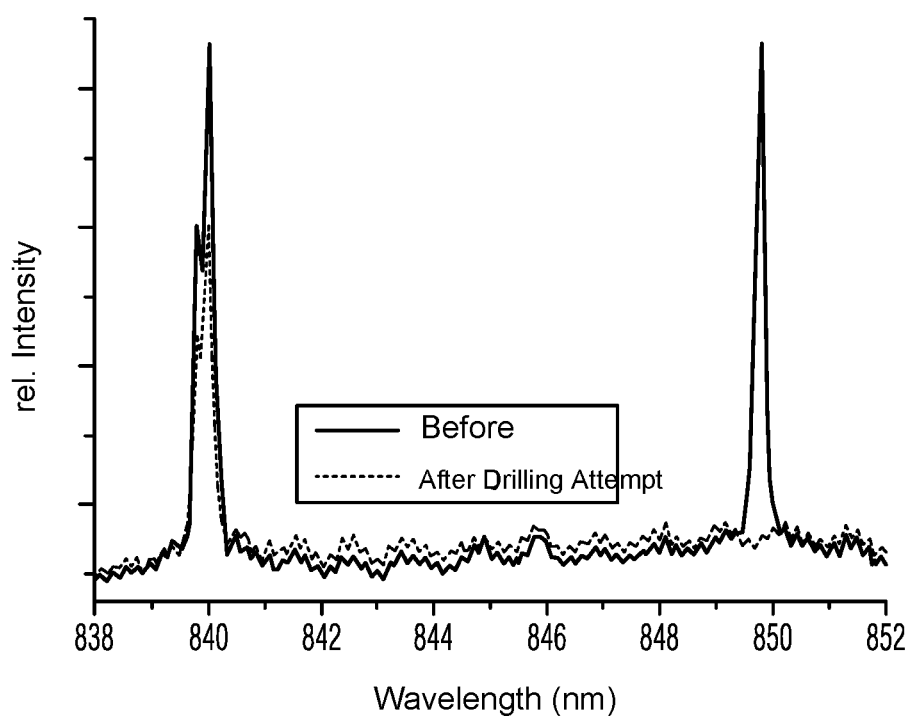
FIG. 6 shows the change in the signature when the seal is damaged.

As also shown in FIG. 6, even this comparatively minor damage can clearly be proven by means of the signature. For example, the maximum at about 850 nm has fully disappeared. Even the maximum at 840 nm has a lower amplitude. In addition, the intensity of the substrate between the two maximums has increased.

Therefore, even a minor damage by laser radiation can be clearly proven.

Figure 7:
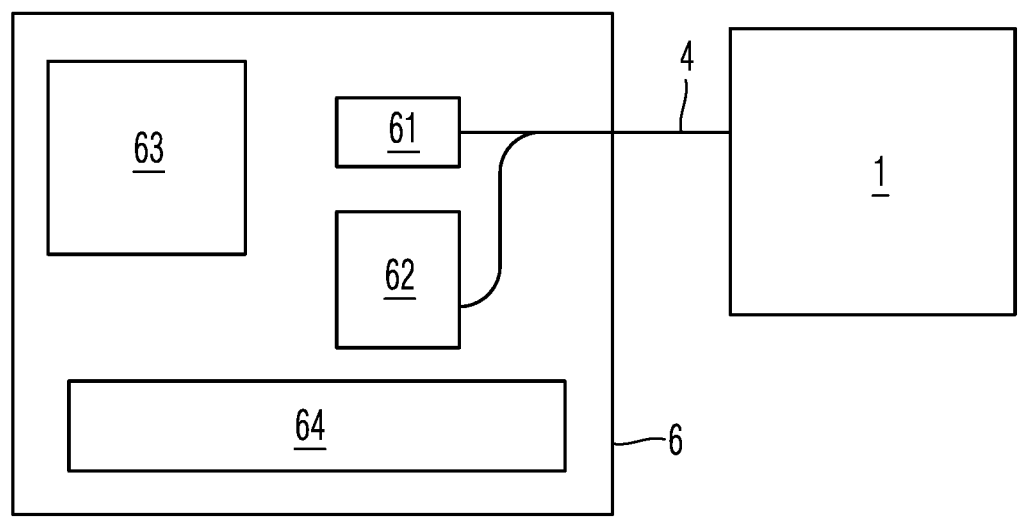
FIG. 7 shows the block diagram of a reading device.

FIG. 7 explains, by way of example, a reading device. The reading device 6 has a terminal to which the connection waveguide 4 can be connected in order to connect a seal 1 to the reading device 6.

The reading device 6 also has a light source 61, the radiation of which can be supplied to the seal 1 via the connection waveguide 4. In the seal 1, this light propagates in the waveguides, as explained above by means of FIGS. 1 and 2.

The light is reflected by the Bragg gratings of the seal 1. This reflected light again passes through the connection waveguide 4 and reaches a coupler in the interior of the reading device 6. It connects a spectrometer 62, e.g. an AWG or a micromirror array, to the seal 1.

The reply signal determined in this way is referred to as the signature of the seal 1 for the purposes of the present invention. This signature can be processed by means of an evaluation unit 63 which contains e.g. a microprocessor or a DSP. Alternatively or additionally, such a signature can be stored in a reference signal memory 64. The reference signal memory 64 can comprise e.g. a semiconductor memory, a hard disk or also a cloud memory.

The invention proposes to read out a signature after the assembly of the seal 1 with a first optical interrogation signal in the described way and to store this signature in the reference signal memory 64. If the integrity of the seal 1 shall be checked at a later date, a signature of the seal 1 is again detected in the described way by means of a second optical interrogation signal. This second signature can then be compared with the previously deposited reference signal from the reference signal memory 64 by means of the interrogation signal. In the case of deviations which can be recognized e.g. in automated fashion by pattern recognition, the reading device 6 can emit an acoustic and/or optical alarm which indicates that the seal 1 was compromised.

The optical reading signal generated by the light source 1 can have a plurality of light pulses which differ as regards the time structure, by means of their spectral range or the polarization direction to thus be able to read out even complex seals 1.

It goes without saying that the invention is not limited to the illustrated embodiments. Therefore, the above description should not be considered limiting but explanatory. The following claims should be understood in such a way that a stated feature is present in at least one embodiment of the invention. This does not exclude the presence of further features. If the claims and the above description define "first" and "second" embodiments, this designation serves to distinguish between two similar embodiments without determining a ranking order.

The invention claimed is:

1. A seal, comprising a substrate, adapted to be applied to an object to be sealed, wherein the substrate comprises a polymer or a glass and the substrate accommodates at least one optical waveguide, said at least one optical waveguide comprising at least one first Bragg grating, the substrate having a thickness of less than 200 µm, a length of more than 1 mm, and a width of more than 1 mm, and tampering with said seal results in a detectable change to the seal.

2. The seal of claim 1, wherein the substrate has a thickness of less than about 100 µm or less than about 80 µm or less than about 50 µm.

3. The seal of claim 1, wherein said at least one optical waveguide includes a first optical waveguide and a second optical waveguide, said seal comprising at least one coupler arranged in the substrate, said at least one coupler connecting said first optical waveguide and said second optical waveguide to a connection waveguide or to a terminal for a connection waveguide.

4. The seal of claim 1, wherein the at least one optical waveguide is a single-mode optical waveguide.

5. The seal of claim 1, wherein the at least one first Bragg grating has a polarization-dependent reflection or a polarization-dependent transmission.

6. The seal of claim 1, wherein the substrate has at least one edge and said seal comprises a frame on said at least one edge.

7. The seal of claim 1, further comprising an optical fiber as a connection waveguide coupled to said at least one optical waveguide, said connection waveguide extending away from said seal.

8. The seal of claim 7, wherein at least one Bragg grating is arranged in the connection waveguide.

9. A system including the seal of claim 1, comprising an interrogation device, which includes a light source or a spectrometer or an evaluation unit or a reference signal memory.

10. A method for sealing, comprising:
providing a seal having a substrate comprising a polymer or a glass, said substrate having a thickness of less than about 200 µm, a length of more than 1 mm and a width of more than 1 mm, said substrate accommodating at least one optical waveguide, said at least one optical waveguide comprising at least one first Bragg grating;
applying said substrate to an object to be sealed;
coupling a first optical interrogation pulse into the at least one waveguide after said substrate is applied to the object; and
detecting a first signal reflected by the at least one first Bragg grating as a signature of the seal,
wherein tampering with said seal results in a detectable change in the signature of the seal.

11. The method of claim 10, wherein during the step of applying said substrate to an object to be sealed, the substrate is exposed to a mechanical stress which alters the signature of the seal.

12. The method of claim 10, comprising;
storing the signature of the seal in a reference signal memory as a reference signal.

13. The method of claim 12, comprising:
coupling a second optical interrogation signal into the at least one waveguide;
detecting a second signal reflected by the at least one first Bragg grating; and
comparing the second signal with the reference signal; and
determining the integrity of the seal from a deviation between the second signal and the reference signal.

14. The method of claim 13, wherein said step of comparing said second signal with the reference signal comprises:
comparing a first reflection spectrum of the reference signal to a second reflection spectrum of said second signal, said first and second reflection spectrum each including reflection peaks corresponding to the at least one first Bragg gratings, each of said reflection peaks having a spectral width, an amplitude, and a position corresponding to a reflection wavelength: and
detecting differences in any of the spectral width, the amplitude, or the position of reflection peaks in the second signal with respect to the spectral width, the amplitude, or the position of the reflection peaks of the reference signal.

15. The method of claim 13, wherein the first or second optical interrogation signal comprises a plurality of light pulses, at least some light pulses of said plurality of light pulses differ from other light pulses of said plurality of light pulses with respect to a wavelength, or a propagation time, or a polarization.

16. The method of claim 13, comprising
providing at least one second Bragg grating;
measuring a temperature by means of said at least one second Bragg grating; and
standardizing said reference signal and said second signal reflected by the at least one first Bragg gratings at the measured temperature.

17. The seal of claim 1, wherein said substrate is used as a cladding for the at least one optical waveguide, such that the waveguide can be produced by writing the core into the substrate.

18. The seal of claim 1, wherein said at least one optical waveguide forms a meandering pattern on said substrate.

19. The seal of claim 1, wherein the waveguide consists of a spatial region of the substrate which has a modified refractive index with respect to the surrounding material of the substrate, as a result of which total reflection occurs at a boundary between the spatial region and the surrounding material of the substrate.

20. The method for sealing of claim 10, wherein said step of providing a seal comprises:
modifying a spatial region of the substrate to have a refractive index that is different from the refractive index of the surrounding material of the substrate so that total reflection occurs at a boundary between the special region and the surrounding material of the substrate, thereby forming the at least one waveguide.

* * * * *